United States Patent [19]
Ferraro et al.

[11] 3,811,498
[45] May 21, 1974

[54] INDUSTRIAL TECHNIQUE

[75] Inventors: John J. Ferraro, Barberton, Ohio; Bertrand Norval McDonald, Lynchburg, Va.

[73] Assignee: The Babcock & Wilcox Company, New York, N.Y.

[22] Filed: Apr. 27, 1972

[21] Appl. No.: 248,199

[52] U.S. Cl. ................................. 165/161, 122/32
[51] Int. Cl. ............................................. F28b 9/22
[58] Field of Search ........................... 165/158–161; 122/32

[56] References Cited
UNITED STATES PATENTS

| | | | |
|---|---|---|---|
| 3,132,691 | 5/1964 | Esleeck | 165/158 X |
| 3,576,179 | 4/1971 | Romanos | 122/132 |
| 3,182,719 | 5/1965 | Christ | 165/159 X |
| 2,946,570 | 7/1960 | West | 165/161 X |

FOREIGN PATENTS OR APPLICATIONS

| | | | |
|---|---|---|---|
| 145,540 | 4/1921 | Great Britain | 165/159 |

Primary Examiner—Charles J. Myhre
Assistant Examiner—Theophil W. Streule
Attorney, Agent, or Firm—J. M. Maguire, Esq.; J. P. Sinnott, Esq.

[57] ABSTRACT

An illustrative embodiment of the invention shows an heat exchanger for converting the secondary coolant feedwater in a nuclear power reactor system into superheated steam. The tube sheet adjacent to the feedwater inlet nozzle is protected from thermal shock by discharging the feedwater directly into the economizer and establishing a controlled secondary coolant flow or leakage from the economizer along the terminal portion of the tube bundle to the tube sheet. The heat absorbed in the secondary coolant flowing toward the tube sheet raises the coolant temperature and protects the sheet from thermal shock. The secondary coolant that collects between the economizer and the adjacent tube sheet, moreover, can be reintroduced to the tube bundle or bled from the secondary coolant loop.

3 Claims, 4 Drawing Figures

INDUSTRIAL TECHNIQUE

BACKGROUND OF THE INVENTION

1. Field of the Invention

This invention relates to heat exchangers, and more particularly, to techniques for reducing thermal shock to heat exchanger tube sheets, and the like.

2. Description of the Prior Art

The need to transfer heat from one fluid to another is a relatively common industrial requirement. Chemical processes, power plants and similar facilities are perhaps, typical of the installations that use this sort of equipment.

In a pressurized water nuclear power plant, for instance, a primary coolant water absorbs the heat that is generated in a nuclear reactor. The heated primary coolant is circulated to the inlet head of an heat exchanger. From the inlet head, the primary coolant flows through the tubes that comprise the "tube bundle" and then out of the heat exchanger by way of an outlet head. Secondary coolant water is admitted to the tube bundle through a feedwater inlet nozzle. The nozzle usually is positioned near the sheet or plate that anchors the tubes in the bundle to the outlet head.

Because of the massive character of the heat exchangers that are used in nuclear power plants, these tube sheets may secure as many as 15,000 tubes, each about one-half of an inch in diameter. To accommodate so large a group of tubes in an heat exchanger of reasonable size, the tube sheets frequently are on the order of 24 inches thick.

In these circumstances, the temperature difference across the tube sheet in question tends to produce thermal stresses. For example, the temperature difference that is established between the relatively cold secondary coolant from the feedwater inlet on one side of the tube sheet, and the higher temperature primary coolant in the outlet head on the other side of the tube sheet, can produce unrelieved forces of great magnitude due to the thermal expansion characteristics of the metal. This situation is especially aggravated in thick members, however, in tube sheets, the thermal stresses are generally concentrated in the first few inches of the secondary coolant side of the member. Relating these principles to heat exchanger design, if the temperature difference and the tube sheet thickness are sufficient, thermally generated forces may produce a failure in the sheet, or in some other part of the heat exchanger.

Thermal cycling, in which the temperature differences that are applied to the tube sheet fluctuate through a wide range, further complicate this problem. For instance, structural deterioration caused by metal fatigue may occur at the tube sheet, even if the basic problem of preventing a thermal stress failure has been overcome.

"Economizers" have been suggested for improved heat exchanger efficiency. The presence of an economizer, however, tends to aggravate these thermal shock effects on the tube sheet structure. An economizer in an heat exchanger of the sort under consideration might comprise an array of baffles that is secured within the tube bundle adjacent to the feedwater inlet nozzle in a direction that is generally transverse to the longitudinal orientation of the tubes. The individual baffle plates do not extend across the entire tube bundle but are generally discontinuous members. These plates, moreover, are spaced from each other in a longitudinal direction to form, in the aggregate, labyrinthine passageways for the flow of the secondary coolant through the tube bundle. The baffle plates that comprise the economizer thereby tend to prevent the cold secondary coolant that is discharged at the feedwater inlet from coming into immediate contact with the tube sheet. This temporary feedwater retention provides the secondary coolant with the opportunity to absorb some heat and thus reach an higher temperature before flowing against the tube sheet. In this way the temperature gradient at the tube sheet is somewhat reduced.

This solution, however is not entirely satisfactory. Hydrodynamic and thermal conditions within the secondary coolant side of the heat exchanger occasionally combine to produce unstable steam generation conditions. Oscillations in the secondary coolant outlet steam pressure, for instance, are one way in which these instabilities are manifested.

Accordingly, there is a need to protect heat exchanger tube sheets from excessive thermal stresses while promoting more stable steam generation conditions.

SUMMARY OF THE INVENTION

Thes difficulties are overcome, to a great extent, through the practice of the invention. Illustratively, the economizer baffle plate that is closest to the secondary coolant side of the tube sheet is installed as a continuous, unperforated member. Clearance is provided, however, between the outer surfaces of the tubes in the bundle and the circumferences of the associated holes formed in the plate under consideration. This clearance establishes a controlled inlet coolant leakage into the heat exchanger volume that is defined by the secondary coolant side of the tube sheet and the opposing surface of the continuous economizer plate. The relatively cold feedwater flows along the lengths of the tubes that are exposed within this volume and in this manner absorbs sufficient heat to prevent thermal shock to the tube sheet or to the shell that encloses the heat exchanger.

The secondary coolant preferably may be allowed to flow out of the volume between the economizer and the tube sheet. If the fluid is allowed to flow out of the volume in question it can be readmitted to the tube bundle above the economizer. The plane at which this fluid rejoins the main stream of secondary coolant is determined by the relative pressures of the steam that is rising within the tube bundle and steam developed from the economizer leakage.

The principles of this invention can be suitably embodied in a number of distinctive physical structures. For example, the rate at which the fluid escapes from the volume between the economizer and the tube sheet can be regulated through an extension or skirt that is formed on the end of the shroud that encloses the tube bundle. This skirt protrudes from the continuous economizer plate to the surface of the tube sheet in order to trap the leakage fluid steam in a pocket. Orifices or passageways of predetermined flow capacity can be formed in the skirt to maintain a low and dependable leakage rate from the volume in question.

Alternatively, a valve in a "blow-down" line can be installed to establish communication between the volume of fluid that is trapped between the economizer and the tube sheet and the atmosphere or some other part of the power generation system.

A system characterizing the features of the invention has been found through actual test to exhibit secondary outlet coolant pressure stability through the entire range of load conditions. Some discharge pressure instability was noted at about a 20 per cent load condition. The pressure fluctuations at this load, however, were of low frequency and were nonperiodic in nature. This overall stability may have been caused by the high flow resistance across the economizer plate that tended to "decouple" the steam in the volume formed adjacent to the tube sheet from the steam that was rising in the tube bundle.

The tests also indicated that the fluid between the economizer and the tube sheet under all observed conditions existed as superheated steam, i.e., the vapor possessed more than enough heat to remain as a dry gas at the pressure within the volume between the economizer and the tube sheet.

The various features of novelty which characterize the invention are pointed out with particularity in the claims annexed to and forming a part of this specification. For a better understanding of the invention, its operating advantages and specific objects attained by its use, reference should be had to the accompanying drawing and descriptive matter in which there is illustrated and described a preferred embodiment of the invention.

DESCRIPTION OF THE PREFERRED EMBODIMENTS

Figure 1:
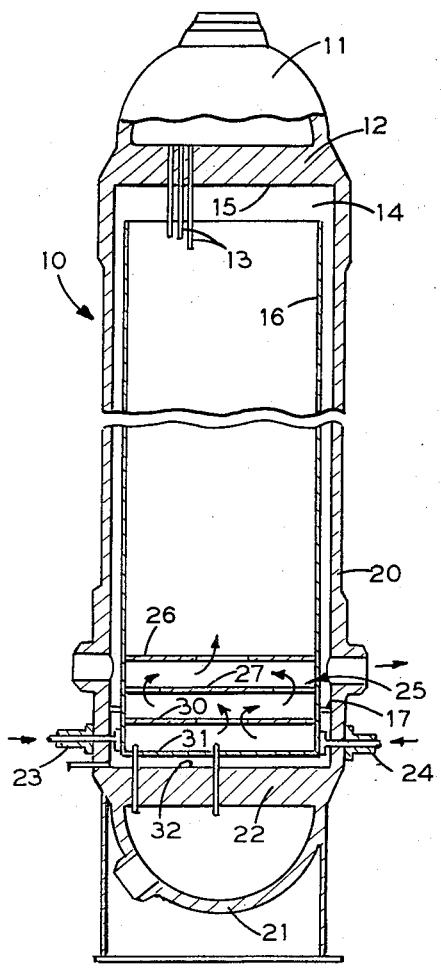
FIG. 1 is a schematic diagram in full section of a typical heat exchanger in accordance with the principles of the invention.

For a more complete appreciation of the invention, attention is invited to FIG. 1 which shows a heat exchanger 10. The heat exchanger is characterized by a primary coolant inlet head 11 and an inlet head tube sheet 12 that anchors the inlet ends of the longitudinally disposed tubes, only a few of which are shown for illustrative purposes in tube bundle 13.

With the exception of a clearance 14 that is adjacent to secondary coolant surface 15 on the inlet head tube sheet 12, the tube bundle 13 is enclosed by a shroud 16. The shroud 16 has an annular transverse flange 17. The periphery of the flange 17 is secured to the inner surface of a generally cylindrical shell 20 to secure the shroud 16 in proper relative position.

The shell 20 encloses the entire heat exchanger and is welded or otherwise suitably fastened to the primary coolant discharge or outlet head 21 and inlet head 11. A transversely disposed outlet head tube sheet 22 provides the means for securing the discharge ends of the tubes in the bundle 13 to the heat exchanger structure.

Feedwater inlets 23 and 24 provide fluid communication for the secondary coolant through the shell 20 and the shroud 16 to the heat exchanger volume that is external to the tubes in the bundle 13. As shown, the feedwater inlets are adjacent to the outlet head tube sheet 22. The flange 17 on the shroud 16 restricts the feedwater flow path, moreover, to the volume that is defined by the tube bundle 13, inasmuch as the flange blocks free fluid communication through the annular passageway between the shroud and the inner surface of the shell 20.

An economizer 25 receives the relatively cold feedwater. The economizer comprises an array of transverse baffle plates 26, 27, 30 and 31 that are longitudinally spaced from each other. The baffle plates 26, 27, and 30 are each formed from members that are discontinuous or have apertures formed therein. These apertures are not aligned in order to establish labyrinthine paths that compel the feed fluid to travel through the secondary coolant side of the tube bundle 13 in a sinuous or tortuous manner.

In accordance with a characteristic feature of the invention, the baffle plate 31 that is spaced most closely to secondary coolant side 32 of the outlet head tube sheet 22 is a continuous member that does not have the apertures described in connection with the baffle plates 26, 27, and 30. As shown in enlarged scales in FIGS. 2 and 2A, the continuous baffle plate 31 is pierced by each of the tubes in the bundle 13. These tubes pass through a volume 33 that is defined between the plate 31 and the secondary coolant side 32 of the outlet head tube sheet 22. Bores 34 and 35 formed in the baffle plate 31 have diameters that are slightly greater than the outside diameters of the respective tubes that pass through the plate 31. The discharge ends of the tubes in the bundle 13, moreover, are anchored in the tube sheet 22.

The small annular passageways thus formed between each tube in the bundle 13 and surfaces of the respective bores in the baffle plate 31 enables relatively cold feedfluid to flow or to leak along the surfaces of the tubes and drain into the volume 33. In leaking along the tube surfaces, the feedfluid absorbs heat from the primary coolant that flows within each of these tubes. The heat absorbed by the feedwater in the foregoing manner increases the feedwater temperature and thereby reduces the possibility for thermal shock or excessive thermal stresses to the outlet head tube sheet 22.

Experiments have shown that the feedfluid within the volume 33 is in a superheated condition. Accordingly, the steam pressure generated in the volume 33 tends to regulate the volume of the fluid that leaks along the tubes in the bundle 13.

In one preferred embodiment of the invention, this fluid is "trapped" within the volume 33 and builds up a steam pressure that effectively prevents further leakage through the economizer baffle plate 31 other than a degree of circulation back into the economizer by way of the bores 34 and 35 in the plate 31.

This steam pressure within the volume 33, moreover, preferably is regulated through a valve 36 that selectively interrupts the fluid communication that a "blowdown" or leakage control conduit 37 establishes between the volume 33 and the atmosphere or some other lower pressure portion of the steam system.

Figure 2:
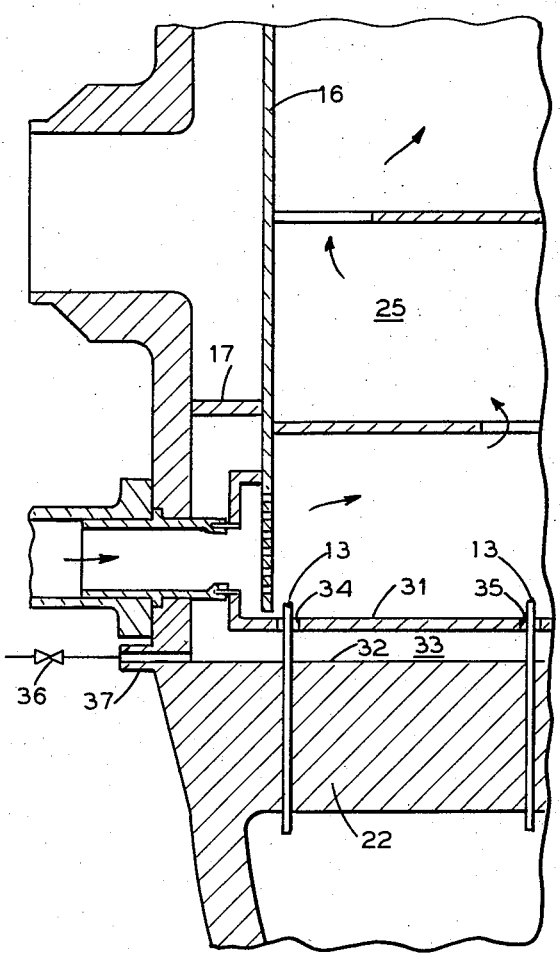
FIG. 2 is an enlarged view in full section of a portion of the heat exchanger shown in FIG. 1.
Figure 3:
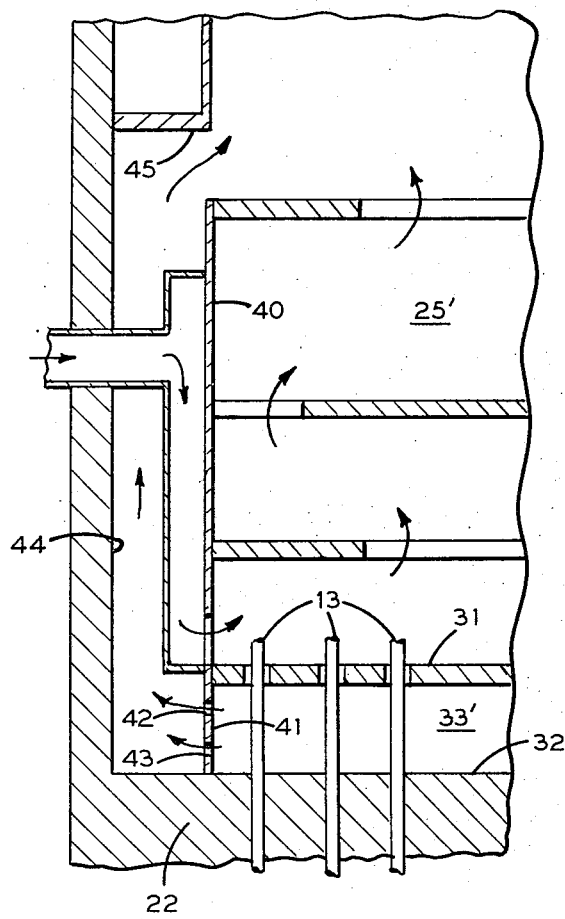

A further embodiment of the invention is shown in FIG. 3. The economizer 25¹ performs the same functions as that which was described above in connection with FIGS. 1 and 2. Shroud 40, however, which encloses the tubes in the bundle 13 does not terminate at the economizer baffle plate 31, but has a cylindrical skirt 41 that extends from the plate 31 to the secondary coolant side 32 of the outlet head tube sheet 22 in order to completely enclose the volume $33^1$.

To regulate steam pressure within the volume $33^1$, orifices 42 and 43 are formed in the skirt 41 to regulate flow conditions from the volume $33^1$ into a by-pass conduit 44. The by-pass conduit 44 establishes free communication for the fluid discharged from the orifices 42 and 43 and the secondary coolant side of the tube bundle 13.

Naturally, the steam pressure generated in the volume $33^1$ as manifested at the discharge side of the orifices 42 and 43, must be at least somewhat higher than the pressure in the tube bundle at a readmission nozzle 45.

Figure 2A:
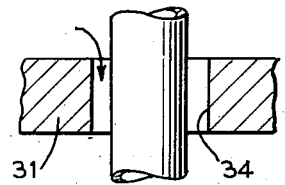
FIG. 2A is a further enlargement of a portion of the structure shown in FIG. 2; and, FIG. 3 is a schematic diagram in full section of a portion of a heat exchanger that illustrates another embodiment of the invention.

The steam from the volume 33, of course, also can be disposed of through "blowdown" or in some other suitable manner as described in connection FIGS. 1 and 2. Similarly, the steam raised in the volume 33 (FIG. 2) can be readmitted to the tube bundle 13, if advisable.

What is claimed is:

1. A heat exchanger comprising a longitudinally disposed tube bundle, a tube sheet for anchoring said tube bundle, a feedwater inlet conduit spaced from said tube sheet, an economizer spaced from said tube sheet, said economizer having a shroud, a plurality of longitudinally spaced plates are disposed generally transverse to said tube bundle within said shroud, one of said plates being adjacent to and spaced from said tube sheet and having a plurality of holes formed therein to enable said bundle of tubes to pass therethrough, said separation between said tube sheet and said adjacent economizer plate establishing a space therebetween, each of said economizer plate holes and said respective tubes providing individual clearances to enable feedwater to flow into said established space between said tube sheet and said adjacent economizer plate, said space established between said tube sheet and said adjacent economizer plate providing a volume for generating a steam pressure therewithin that effectively prevents the feedwater from flowing through said clearances from producing destructive thermal stresses in said tube sheet, a skirt extending from said shroud and enclosing the space established between said tube sheet and said economizer plate said skirt depending longitudinally from said shroud into said space between said plate and said tube sheet to regulate the flow of fluid from the space, said skirt having at least one orifice formed therein to promote fluid discharge from the space, and conduit means within the heat exchanger for readmitting fluid from the space between said adjacent economizer plate and said tube sheet to said tube bundle.

2. A heat exchanger according to claim 1 further comprising means for discharging feedwater from the space established between said tube sheet and said adjacent economizer plate.

3. A heat exchanger according to claim 2 wherein said discharging means further comprises valve means for selectively discharging fluid from the space between said adjacent economizer plate and said tube sheet.

* * * * *